US012198842B2

(12) United States Patent
Lu et al.

(10) Patent No.: US 12,198,842 B2
(45) Date of Patent: Jan. 14, 2025

(54) MAGNETIC ASSEMBLY AND POWER SUPPLY APPARATUS

(71) Applicant: Delta Electronics (Shanghai) Co., Ltd., Shanghai (CN)

(72) Inventors: Zengyi Lu, Shanghai (CN); Haijun Yang, Shanghai (CN); Shiwei Liu, Shanghai (CN); Jinfa Zhang, Shanghai (CN)

(73) Assignee: Delta Electronics (Shanghai) Co., Ltd., Shanghai (CN)

( * ) Notice: Subject to any disclaimer, the term of this patent is extended or adjusted under 35 U.S.C. 154(b) by 892 days.

(21) Appl. No.: 17/322,922

(22) Filed: May 18, 2021

(65) Prior Publication Data

US 2021/0358673 A1 Nov. 18, 2021

(30) Foreign Application Priority Data

May 18, 2020 (CN) ......................... 202010419925.5

(51) Int. Cl.
*H01F 27/32* (2006.01)
*H01F 27/02* (2006.01)
(Continued)

(52) U.S. Cl.
CPC ............. *H01F 27/24* (2013.01); *H01F 27/02* (2013.01); *H01F 27/08* (2013.01); *H01F 27/325* (2013.01)

(58) Field of Classification Search
CPC .......... H01F 27/24; H01F 27/02; H01F 27/08; H01F 27/325; H01F 27/306; H01F 3/12;
(Continued)

(56) References Cited

U.S. PATENT DOCUMENTS 5,831,505 A * 11/1998 Yamaguchi ........... H01F 27/255 336/212
7,135,949 B2 * 11/2006 Reppe ................... H01F 27/027 336/212
(Continued)

FOREIGN PATENT DOCUMENTS

CN 202839266 U 3/2013
CN 208444723 U 1/2019
(Continued)

OTHER PUBLICATIONS

Corresponding Chinese office action issued on Dec. 9, 2020.

*Primary Examiner* — Shawki S Ismail
*Assistant Examiner* — Kazi S Hossain
(74) *Attorney, Agent, or Firm* — CKC & Partners Co., LLC

(57) ABSTRACT

The disclosure provides a magnetic assembly and a power supply apparatus. The magnetic assembly of the present disclosure includes: a first magnetic core, a plurality of windings, a housing and a second magnetic core, where the first magnetic core has a winding area, and the plurality of windings are wound with an interval on the winding area of the first magnetic core; the housing has an accommodating cavity, and at least part of the plurality of windings is accommodated in the accommodating cavity, and the second magnetic core is arranged between a cavity wall of the accommodating cavity and the plurality of windings. According to the present disclosure, parasitic parameters such as leakage inductance of the magnetic assembly are relatively stable, and the power supply efficiency is improved and higher.

20 Claims, 12 Drawing Sheets

(51) Int. Cl.
*H01F 27/08* (2006.01)
*H01F 27/24* (2006.01)

(58) Field of Classification Search
CPC .... H01F 27/025; H01F 27/263; H01F 27/346; H01F 2027/348; H01F 27/22
USPC .......................................... 336/212, 221, 83
See application file for complete search history.

(56) References Cited

U.S. PATENT DOCUMENTS

| | | | | |
|---|---|---|---|---|
| 2008/0303624 | A1* | 12/2008 | Yamada | H01F 17/043<br>336/212 |
| 2018/0350512 | A1* | 12/2018 | Yang | H01F 27/22 |
| 2019/0392976 | A1* | 12/2019 | Inagaki | H01F 27/22 |
| 2020/0295665 | A1* | 9/2020 | Jimichi | H01F 27/24 |

FOREIGN PATENT DOCUMENTS

| | | | |
|---|---|---|---|
| CN | 109524221 | A | 3/2019 |
| CN | 209071117 | U | 7/2019 |
| CN | 109153528 | B | 9/2020 |

* cited by examiner

MAGNETIC ASSEMBLY AND POWER SUPPLY APPARATUS

CROSS-REFERENCE TO RELATED APPLICATIONS

This application claims priority to Chinese Patent Application No. 202010419925.5, filed on May 18, 2020, entitled “Magnetic assembly and power supply apparatus”, which is incorporated herein by reference in its entirety.

TECHNICAL FIELD

The present disclosure relates to the field of power electronics and, in particular, to a magnetic assembly and a power supply apparatus.

BACKGROUND

With the continuous development of on-board charger (OBC) technologies, a magnetic assembly as one of the key components, especially the main transformer, has gotten more and more recognition, research and attention.

A multi-slot transformer has become a better option because it is easy to integrate the resonant inductor into the transformer, and has better electrical performance, simple the manufacturing process, as well as higher reliability. The multi-slot transformer includes a magnetic core and separately wound windings. By means of separate arrangement of the primary winding and the secondary winding, the multi-slot transformer obtains a series of benefits, such as integration of the transformer and the resonant inductor, and reduction of EMI (Electromagnetic Interference) due to the reduction of common mode coupling capacitance between the primary winding and the secondary winding, facilitation for thermally conductive glue filling and heat dissipation. Meanwhile, most part of the windings are exposed outside because of using UR type magnetic core, which is more conducive to heat dissipation. Therefore, the multi-slot transformer has broad prospects and more advantages in the application of OBC.

However, in the application of OBC, the multi-slot transformer need to be arranged in a cooling cavity, which is usually made of aluminum, aluminum alloy or copper or other metal materials, and the cavity is cooled by means of air cooling or liquid cooling or other heat-dissipation ways. However, when the multi-slot transformer is placed in the metal cavity, due to the mutual influence between the metal cavity and the external leakage magnetic flux of the transformer, on the one hand, it very easily results in a change of the leakage inductance of the multi-slot transformer, that is, affects the stability of the electrical parameters of the power supply, and makes the operation characteristics to deviate or deteriorate; on the other hand, the external leakage magnetic flux will further result in eddy-current losses on the cavity, which will increase the total loss of the OBC and thus reduce the power supply efficiency.

SUMMARY

The present disclosure provides a magnetic assembly and a power supply apparatus.

In a first aspect, the present disclosure provides a magnetic assembly, including:

a first magnetic core and a plurality of windings, where the first magnetic core has a winding area, and the plurality of windings are wound with an interval on the winding area of the first magnetic core;

a housing, where the housing has an accommodating cavity, and at least part of the plurality of windings is accommodated in the accommodating cavity; and a second magnetic core, where the second magnetic core is arranged between a cavity wall of the accommodating cavity and the plurality of windings.

In a second aspect, the present disclosure provides a power supply apparatus, including the magnetic assembly as described above.

In an embodiment, the power supply apparatus is used for an on-board charger (OBC).

BRIEF DESCRIPTION OF DRAWINGS

In order to more clearly explain the embodiments of the present disclosure or the technical solutions in the prior art, the following will briefly introduce the drawings required in the embodiments or the description of the prior art, and it is obvious that the drawings in the following description are some embodiments of the present disclosure. For those of ordinary skill in the art, other drawings can be obtained based on these drawings without paying any creative work.

Figure 3:
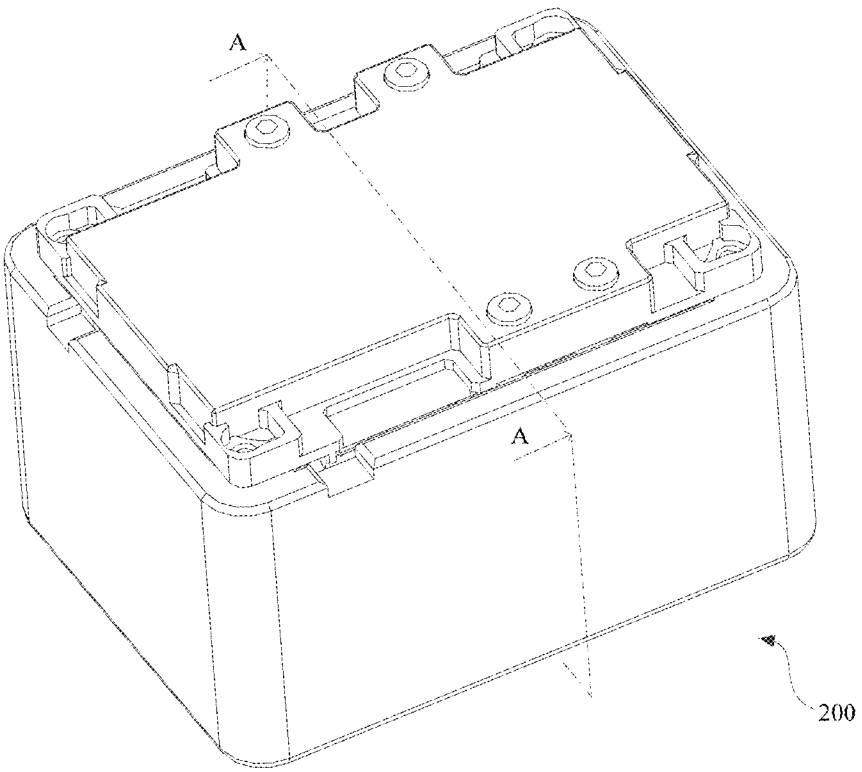
FIG. 3 is a schematic diagram of the shape of a magnetic assembly provided by an embodiment of the present disclosure.
Figure 4A:
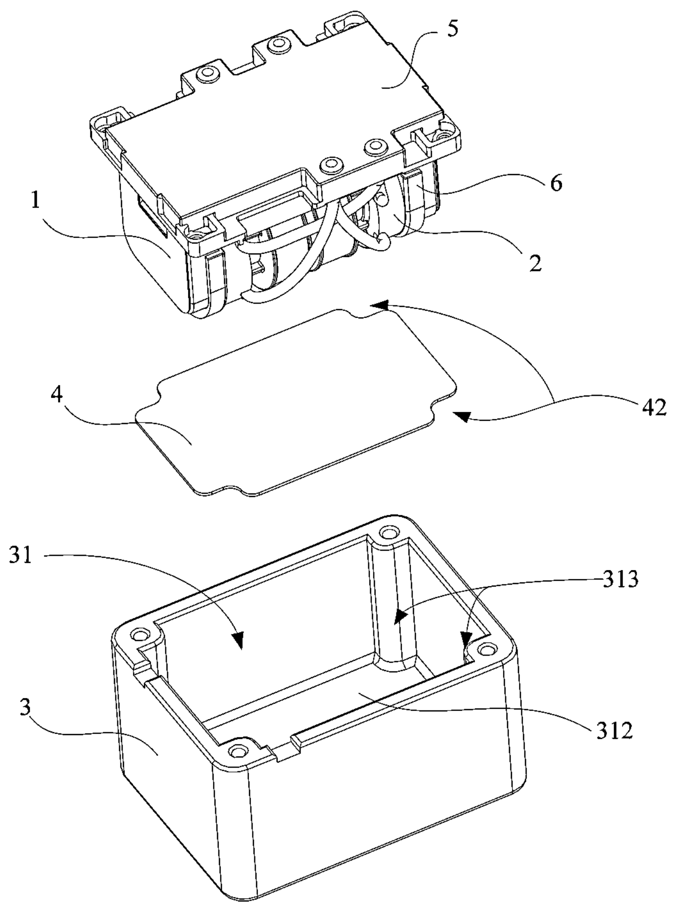
Figure 4B:
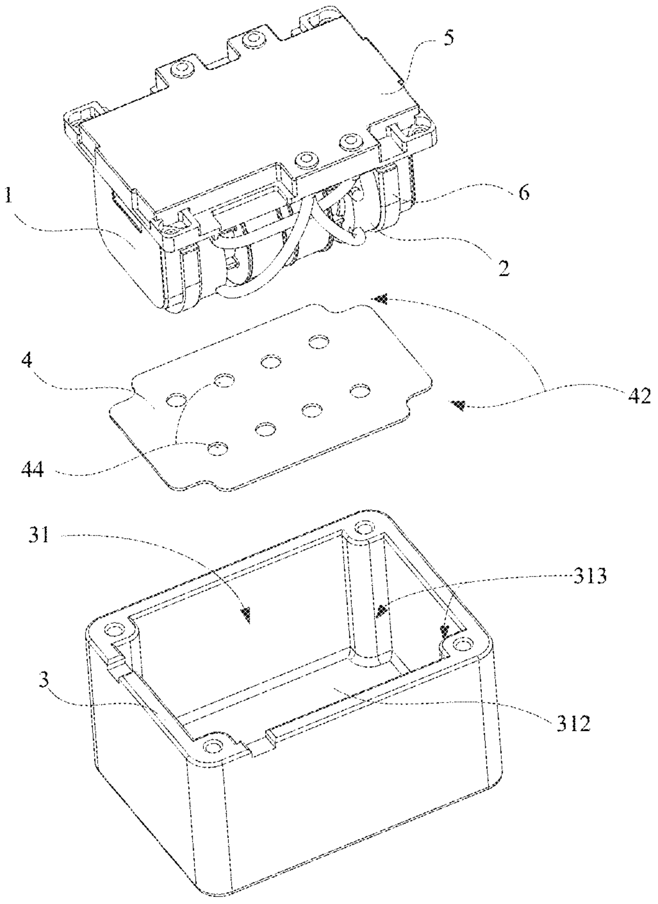
Figure 5:
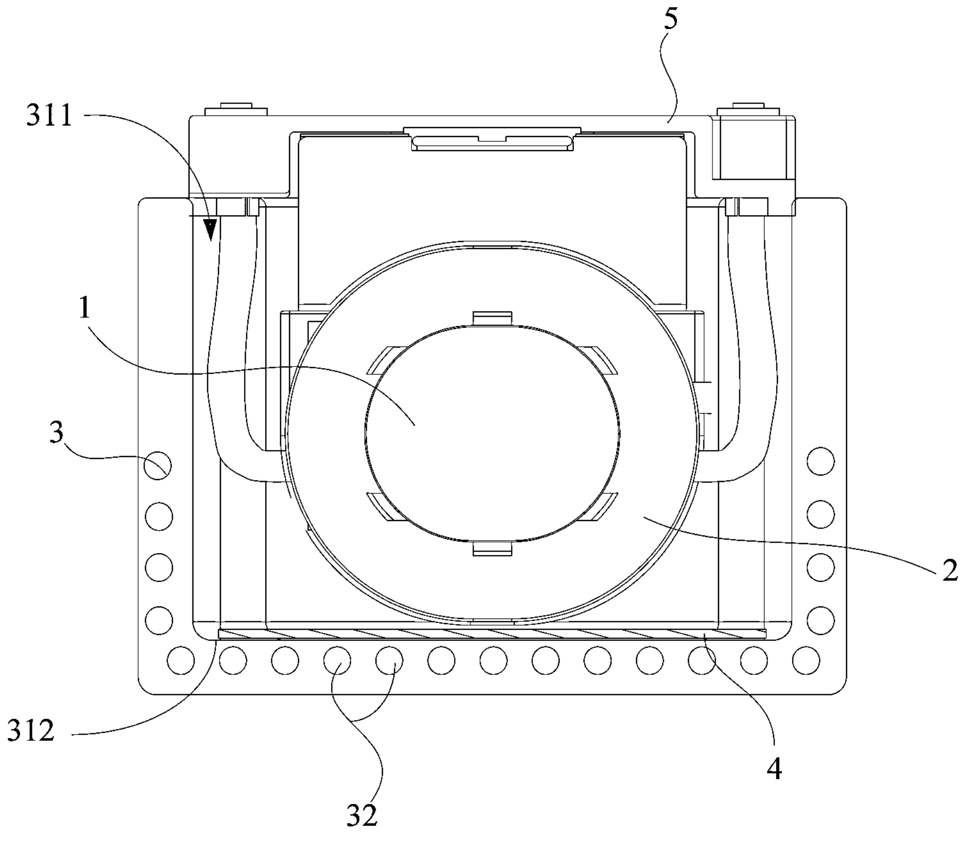
Figure 6:
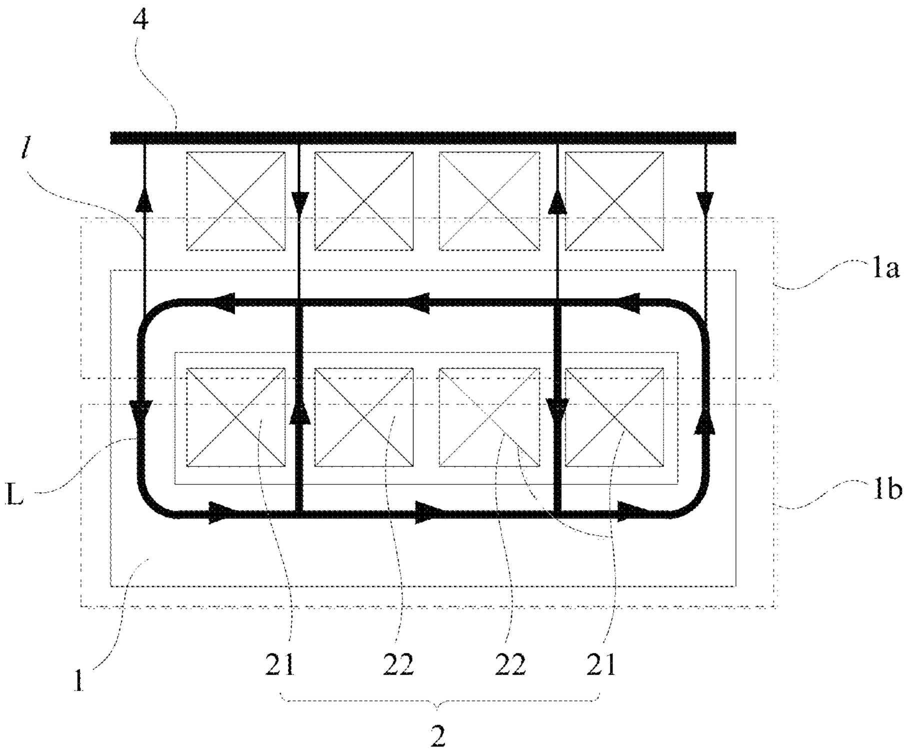
Figure 7:
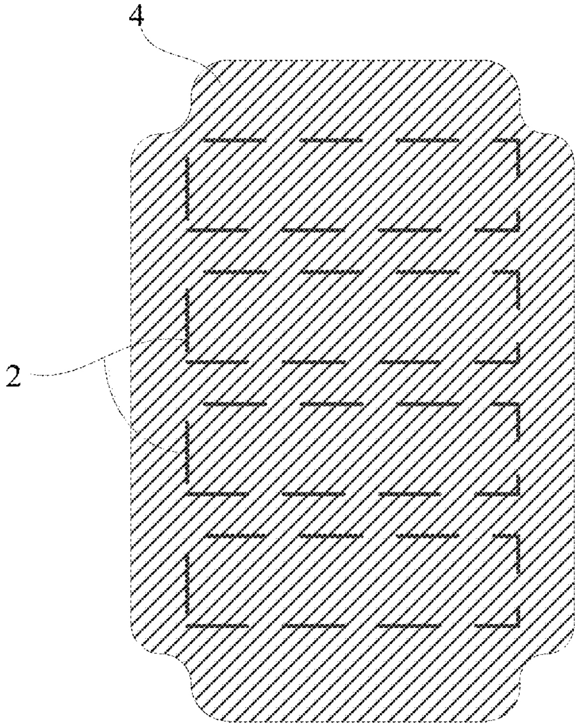
Figure 8:
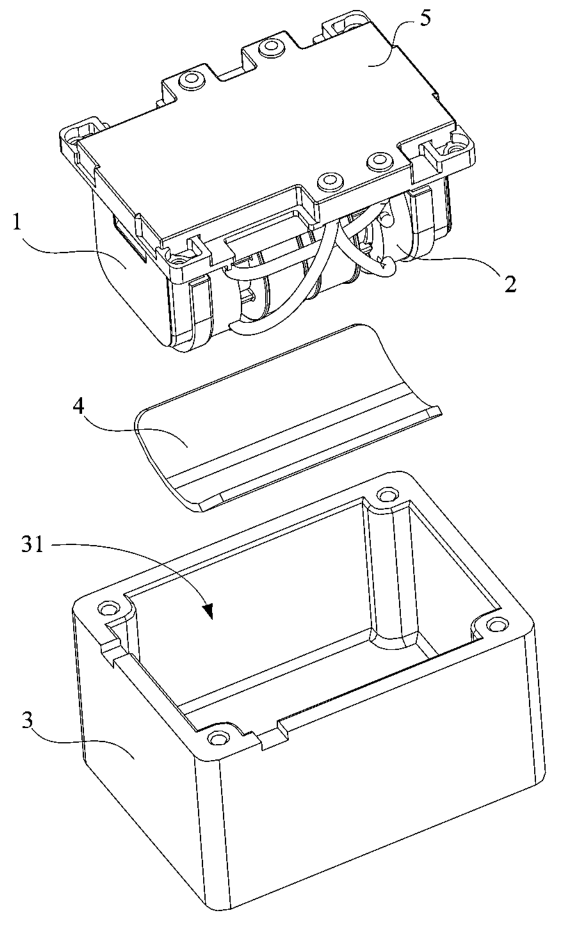
Figure 9:
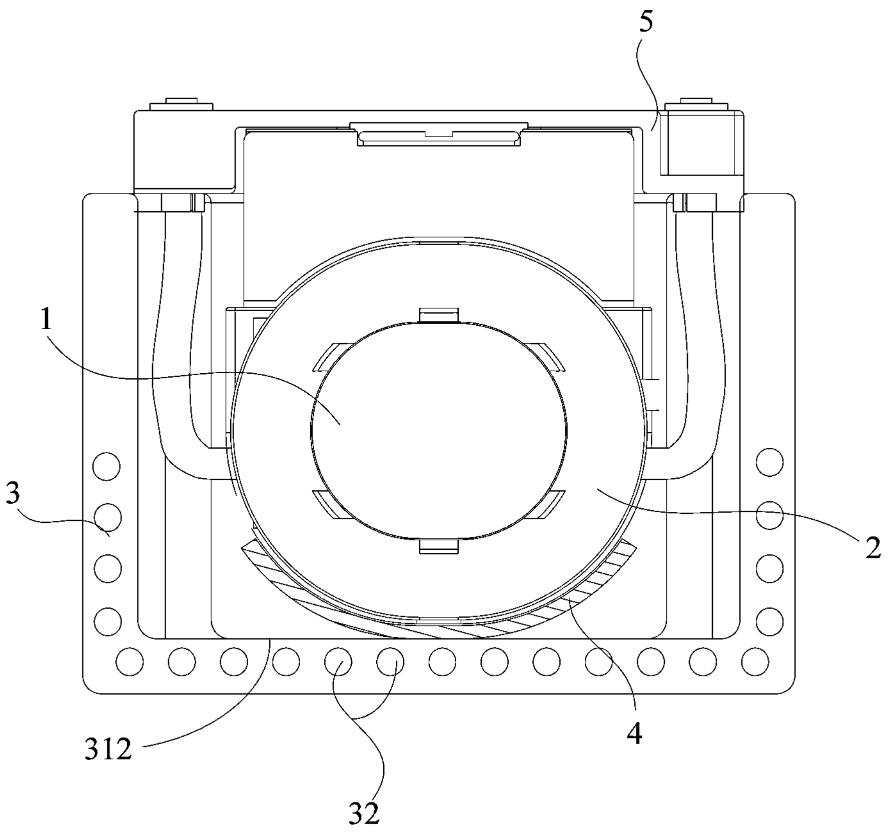
Figure 10:
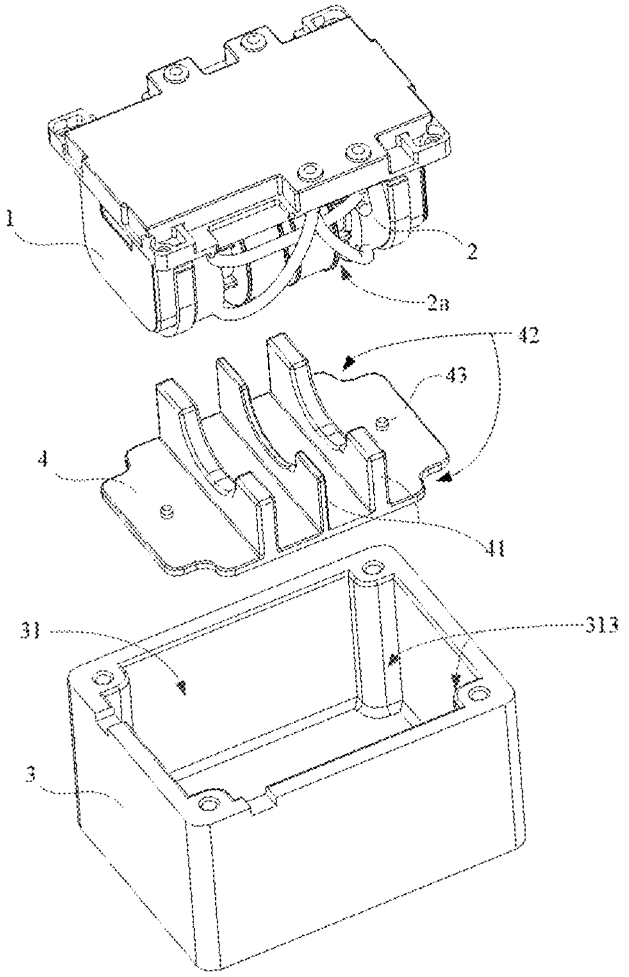
Figure 11:
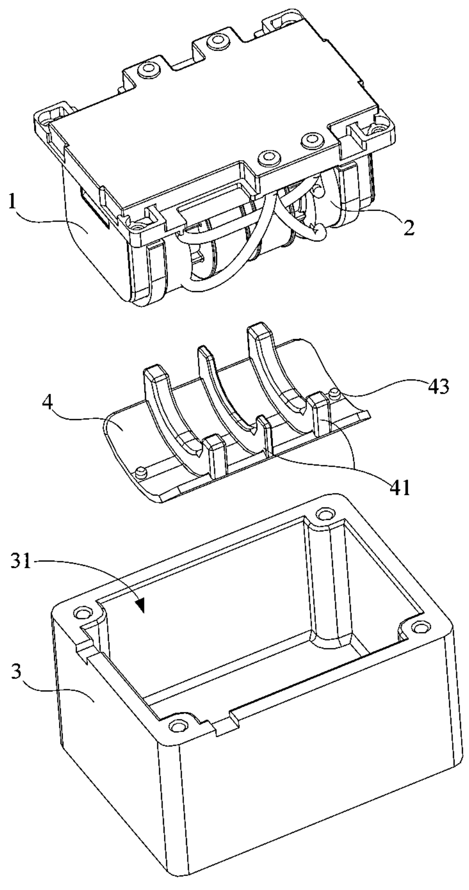
Figure 12:
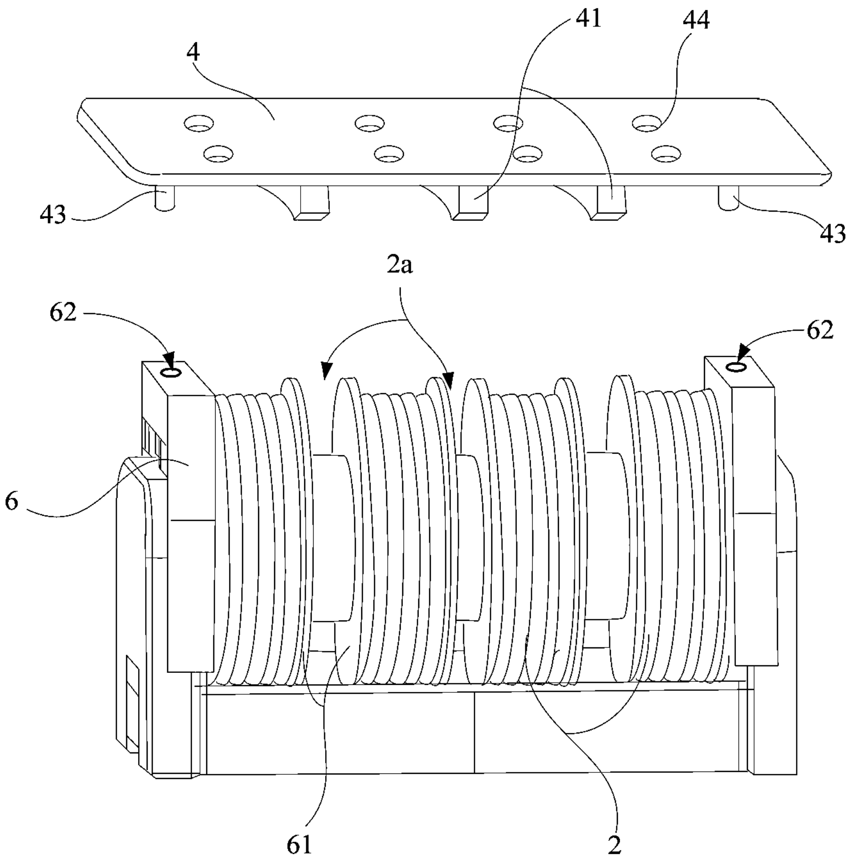

FIG. **4*a* is a schematic diagram of an internal structure of the magnetic assembly shown in FIG. 3**;

FIG. **4*b* is a schematic diagram of a second internal structure of the magnetic assembly shown in FIG. 3**;

FIG. 5 is a schematic cross-sectional view of the cross section A-A of the magnetic assembly shown in FIG. 4;

FIG. 6 is a schematic diagram of the magnetic flux circuit of the magnetic assembly shown in FIG. 4;

FIG. 7 is a schematic diagram of a projection range of a second magnetic core on windings of the magnetic assembly provided by an embodiment of the present disclosure;

FIG. 8 is a schematic diagram of a third internal structure of the magnetic assembly shown in FIG. 3;

FIG. 9 is a schematic cross-sectional view of the cross section A-A of the magnetic assembly shown in FIG. 8;

FIG. 10 is a schematic diagram of a fourth internal structure of the magnetic assembly shown in FIG. 3;

FIG. 11 is a schematic diagram of a fifth internal structure of the magnetic assembly shown in FIG. 3;

FIG. 12 is a schematic diagram of a connection structure of the second magnetic core and a bobbin in the magnetic assembly provided by an embodiment of the present disclosure.

DESCRIPTION OF EMBODIMENTS

First of all, those skilled in the art should understand that these embodiments are only used to explain the technical principles of the present disclosure, and are not intended to limit the protection scope of the present disclosure. Those skilled in the art can make adjustments as needed, so as to adapt to specific applications Secondly, it should be noted that in the description of the present disclosure, the terms such as “inner” and “outer” and other terms indicating direction or positional relationship are based on the direction or the positional relationship shown in the drawings, which are just for ease of description, rather than indicating or implying that the apparatus or element must have a specific orientation and position or be constructed and operated in a specific orientation and position, and therefore they cannot be construed as a limitation of the present disclosure.

In addition, it should also be noted that, in the description of the present disclosure, unless otherwise clearly specified and defined, the terms "connect" and "connection" should be understood in a broad sense, for example, it can be a fixed connection or a detachable connection, or integral connection; it can be a mechanical connection or an electrical connection; it can be a direct connection, or an indirect connection through an intermediary; or it can be a communication between two members. For those skilled in the art, the specific meanings of the above terms in the present disclosure can be understood according to specific situations.

In addition, the terms "first" and "second" are used for description purposes only, rather than be understood as indicating or implying relative importance or implicitly indicating the number of technical features indicated. Thus, the features defined by "first" and "second" may explicitly or implicitly include one or more of the features. In the description of the present disclosure, the meaning of "a plurality of" is at least two, such as two, three, etc., unless otherwise specifically limited.

With the continuous progress of technology, new energy vehicles have been more and more widely adopted. Correspondingly, in order to ensure the endurance capacity of new energy vehicles, it is necessary to charge the battery pack in the vehicle with OBC or other power supply apparatus. A magnetic assembly, especially a main transformer, as an important component in the OBC, can realize voltage conversion, thereby outputting a voltage that is suitable for the high-voltage battery. In order to shorten charging time, the OBC needs a larger power, which has reached 11 kW or 22 kW in current applications. Accordingly, in order to adapt to the increasing power of the OBC, the requirements of the magnetic assembly are also becoming higher and higher, that is, at least stable electrical parameters and lower losses are required.

Figure 1:
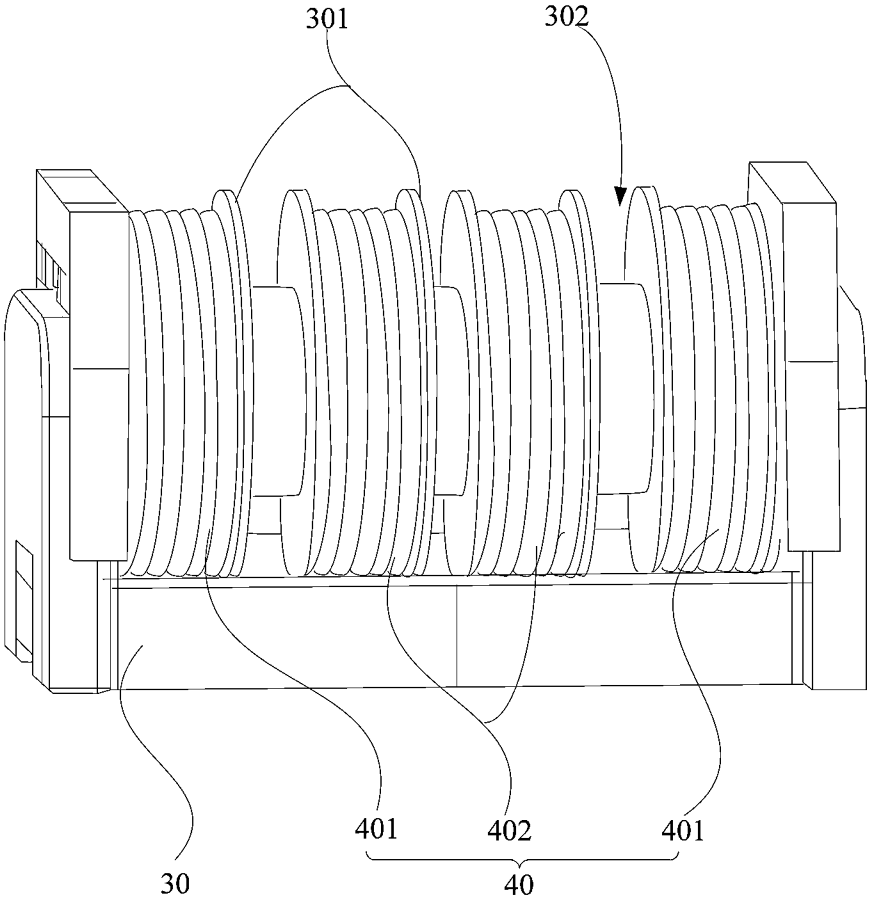
FIG. 1 is a schematic structural diagram of a multi-slot transformer that known to the inventor.

Currently, a mainstream magnetic assembly that known to the inventor is a multi-slot transformer. FIG. 1 is a schematic structural diagram of a multi-slot transformer known to the inventor. The multi-slot transformer 10 mainly includes a magnetic core 30 and windings 40, where a plurality of slot bodies 301 that are independent from each other are arranged on the magnetic core 30, and thus form a multi-slot structure, in which the windings 40 is arranged. In the embodiment shown in FIG. 1, the windings 40 include two primary windings 401 and two secondary windings 402, and the primary windings 401 and the secondary windings 402 are set correspondingly. In other embodiments, the primary windings and the secondary windings can also be swapped, that is, 401 indicates the secondary windings and 402 indicates the primary windings, but the present disclosure is not limited to this. The primary windings 401 and the secondary windings 402 are arranged in different slot bodies 301, and a partition slot 302 is provided between two adjacent windings 40, so that there are intervals between the primary windings 401 and the secondary windings 402. While realizing the integration of the resonant inductor, it is more conducive to the heat dissipation of the windings 40, and the parasitic parameters such as parasitic capacitance between the primary windings 401 and the secondary windings 402 can also be reduced, which is conducive to optimizing the EMI performance.

Figure 2:
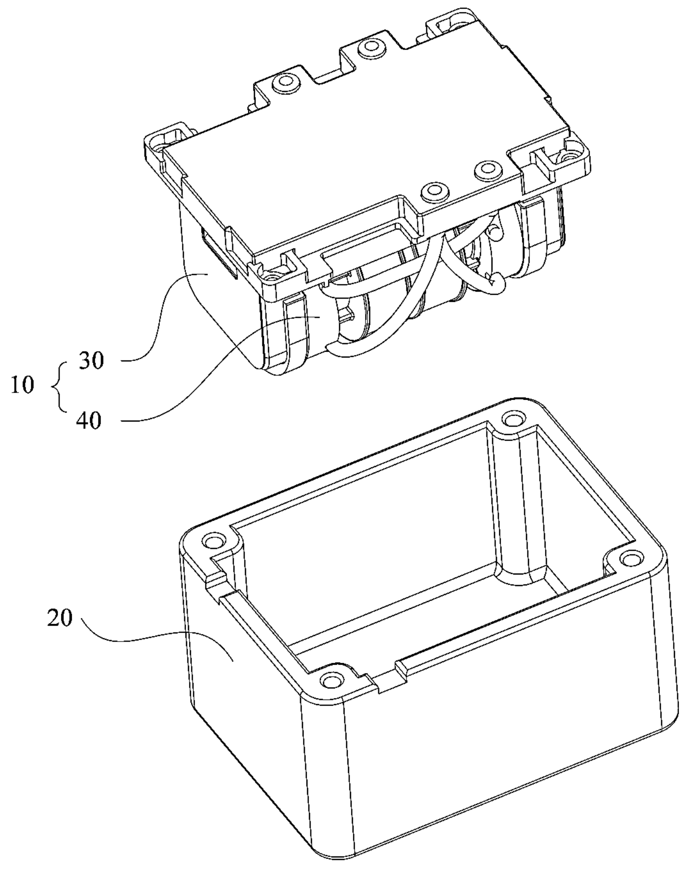
FIG. 2 is a schematic assembly diagram of a metal cavity and the multi-slot transformer shown in FIG. 1.

FIG. 2 is a schematic assembly diagram of a metal cavity and the multi-slot transformer of FIG. 1. As shown in FIG. 2, in practical application, it is necessary for the multi-slot transformer 10 to be potted into the metal cavity 20, and the heat generated by the multi-slot transformer 10 is dissipated through the metal cavity 20, as shown in FIG. 2. However, the metal cavity 20 usually causes the external leakage magnetic field formed by the windings 40 to change, thereby causing the following problems: on the one hand, the metal cavity 20 may reduce the leakage inductance of the multi-slot transformer 10 (reducing by about 5%-15%), that is, the leakage inductance of the multi-slot transformer 10 is greatly reduced (that is, leakage inductance drops), compared to that of the multi-slot transformer not potted into the metal cavity 20, thereby affecting the leakage inductance of the multi-slot transformer and/or the stability of other electrical parameters, and in severe cases, it may even interfere in the normal operation of the power supply apparatus; on the other hand, the external leakage magnetic field may also generate eddy current on the metal cavity 20, thereby causing unnecessary losses, and reducing the efficiency of the multi-slot transformer and that of the power supply apparatus as a whole.

For this purpose, the present disclosure provides with a magnetic assembly with a weak magnetic regulation branch and a power supply apparatus applying the same, which has more stable electrical parameters, lower loss, and higher power efficiency.

FIG. 3 is a schematic diagram of a shape of a magnetic assembly provided by an embodiment of the present disclosure. FIG. 4*a* is a schematic diagram of an internal structure of the magnetic assembly shown in FIG. 3; FIG. 4*b* is a schematic diagram of a second internal structure of the magnetic assembly shown in FIG. 3. FIG. 5 is a schematic cross-sectional view of the cross section A-A of the magnetic assembly shown in FIG. 4. FIG. 6 is another schematic cross-sectional view of the cross section that is perpendicular to the cross section A-A in FIG. 5, and is also a schematic diagram of the magnetic flux circuit of the magnetic assembly shown in FIG. 4. As shown in FIG. 3 to FIG. 6, the magnetic assembly 200 provided by the present disclosure may specifically include the following main components:

a first magnetic core 1 and a plurality of windings 2, where the first magnetic core 1 has a winding area 1*a*, the plurality of windings 2 are wound with an interval on the winding area 1*a;* a housing 3, where the housing 3 has an accommodating cavity 31, and at least part of the plurality of windings 2 is accommodated in the accommodating cavity 31; and a second magnetic core 4, where the second magnetic core 4 is arranged between the cavity wall of the accommodating cavity 31 and the plurality of windings 2;

As shown in FIG. 3 to FIG. 6, where, exemplarily, the first magnetic core 1 may have a closed ring structure so as to form a closed main magnetic flux circuit L inside the first magnetic core 1, and the windings 2 may be wound on one side of the first magnetic core 1. In this embodiment, the material of the first magnetic core 1 may be ferrite or other materials capable of conducting magnetism. In addition, the first magnetic core 1 may also have other structures or forms, and the specific shape of the first magnetic core 1 is not limited herein.

The windings 2 may be wound on the first magnetic core 1 by wrapping or other ways, and specifically, the windings 2 may be wound on one side of the first magnetic core 1. The portion of the first magnetic core 1 wound with the windings 2 constitutes the winding area 1*a* of the first magnetic core 1, and the portion of the first magnetic core 1 not wound with the windings 2 constitutes the non-winding area 1*b* of the first magnetic core 1. At this embodiment, the non-winding area 1*b* of the first magnetic core 1 is located on the side opposite to the winding area 1*a*. It can be understood that, a portion of the windings 2 is located inside the first magnetic core 1, and the other portion of the windings 2 is located outside the first magnetic core 1. Meanwhile, the portion of the windings 2 located inside the first magnetic core 1 will have an internal leakage magnetic flux, and the portion of the windings 2 located outside the first magnetic core 1 will form an external leakage magnetic flux.

There is a plurality of windings 2, and different windings 2 are set with an interval. The plurality of windings 2 include a primary winding 21 and a secondary winding 22. In an embodiment, the primary winding 21 may be arranged in one-to-one correspondence with the secondary winding 22. In this embodiment, both the number of the primary winding 21 and the secondary winding 22 in the plurality of windings 2 may be two, as shown in FIG. 6, but not limited thereto, that is, the number of the primary winding 21 and the secondary winding 22 may be one, three or more.

As a result, the first magnetic core 1 and the winding 2 wound on the first magnetic core 1 may jointly constitute the main functional structure of the magnetic assembly 200, and the first magnetic core 1 and the windings 2 are jointly used to complete the conversion of electrical energy. In this embodiment, the magnetic assembly 200 may specifically be a transformer, and realize electrical isolation and voltage conversion between the primary windings 21 and the secondary windings 22.

In order to encapsulate and dissipate heat for the first magnetic core 1 and the windings 2 wound on the first magnetic core 1, the magnetic assembly 200 further includes a housing 3, where the accommodating cavity 31 of the housing 3 can accommodate at least partial of the windings 2, and at the same time, provide heat conduction and heat dissipation effects for the magnetic assembly 200. The housing 3 may be made of metal materials, such as aluminum, aluminum alloy, or copper, etc.

In addition, in another embodiment, the magnetic assembly 200 may further include a cover 5, where the cover 5 covers the opening 311 of the accommodating cavity 31. At this time, the housing 3 and the cover 5 jointly accommodate the windings 2 and the first magnetic core 1 into the accommodating cavity 31.

When at least part of the windings 2 is accommodated inside the accommodating cavity 31 of the housing 3, it can be known from the previous description, the housing 3 will affect the external leakage magnetic flux formed by the windings 2. Specifically, according to the difference of the relative position and distance between the first magnetic core 1, the windings 2 and the accommodating cavity 31, the degree of influence on the external leakage magnetic flux is also different, and thus the magnitude of the leakage inductance may also vary accordingly. Therefore, in the present disclosure, a second magnetic core 4 is further provided in the magnetic assembly 200, where the second magnetic core 4 is a weak magnetic regulation branch, that is, the second magnetic core 4 provides a weak magnetic flux circuit l mainly for the external leakage magnetic flux. Specifically, the second magnetic core 4 is arranged between the windings 2 and the cavity wall of the accommodating cavity 31, and the second magnetic core 4 provides a weak magnetic flux circuit l for the external leakage magnetic flux of the windings 2, so as to adjust the leakage inductance of the entire magnetic assembly 200 and other parasitic parameters, and thus stabilize these specific parameters, especially the leakage inductance, for example, the resonant inductance of the power supply. In this way, by means of adjusting the second magnetic core 4, the leakage inductance of the magnetic assembly 200 can be kept stable, thereby ensuring the reliable operation of the magnetic assembly 200 and the entire power supply apparatus. At the same time, since the second magnetic core 4 can guide the external leakage magnetic flux of the windings 2, the loss of the accommodating cavity 31 will be reduced and thus the power efficiency will be improved.

Specifically, the material made of the second magnetic core 4 may be ferrite, magnetic powder core material or amorphous magnetic conductive material or other materials. In addition, the second magnetic core 4 may also be made of other magnetic materials well known to those skilled in the art, and the specific material of the magnetic material of the second magnetic core 4 is not limited herein.

The second magnetic core 4 can appropriately adjust and stabilize the leakage inductance of the magnetic assembly. For example, as another embodiment, the adjustment of the leakage inductance of the second magnetic core 4 to the magnetic assembly 200 has a range of 0%-30%, that is, compared to the magnetic assembly 200 without the second magnetic core 4, the leakage inductance of the magnetic assembly provided with the second magnetic core 4 inside the accommodating cavity 31 can be adjusted by +0% to +30% on the basis of the leakage inductance of the magnetic assembly without the second magnetic core 4. So, the leakage inductance of the magnetic assembly provided with the second magnetic core 4 is 100%-130% of the leakage inductance of the magnetic assembly without the second magnetic core 4. The desired stable leakage inductance can be obtained by adjusting the position of the second magnetic core 4 and then fixing the second magnetic core 4.

In order to make the second magnetic core 4 inside the accommodating cavity 31 to achieve the better effects of adjusting the external magnetic leakage of the magnetic assembly and stabilizing the leakage inductance, it is necessary for the second magnetic core 4 to have an appropriate distance from the windings 2 inside the accommodating cavity 31. In an embodiment, the distance between the second magnetic core 4 and the windings 2 is 0 mm-20 mm. In this way, the second magnetic core 4 can have a better adjustment effect on the external leakage magnetic flux of the windings 2, and furthermore, the leakage inductance of the magnetic assembly 200 can be adjusted and stabilized significantly. It should be noted that in the case that the minimum distance between the second magnetic core 4 and the windings 2 is 0 mm, the second magnetic core 4 is attached to the outside surface of the windings 2.

Therefore, the magnetic assembly 200 in the present disclosure provides a weak magnetic flux circuit l for the external leakage magnetic flux of the windings 2 by arranging the second magnetic core 4 inside the accommodating cavity 31 of the housing 3, therefore, the parasitic parameters such as the leakage inductance of the magnetic assembly 200 and the like may be adjusted and maintained to be stable, thereby ensuring the electrical characteristics and reliable operation of the magnetic assembly 200 and the entire power supply apparatus.

The specific structure of the magnetic assembly 200 and various possible implementation manners will be described in detail below.

As another embodiment, as shown in FIG. 5, the accommodating cavity 31 of the housing 3 has an opening 311, through which the first magnetic core 1 is accommodated into the accommodating cavity 31, where the second magnetic core 4 is located on the side of the cavity wall opposite to the opening 311.

In the embodiment, since the first magnetic core 1 is accommodated in the accommodating cavity 31 through the opening 311, a portion of or all of the windings 2 will also be located inside the accommodating cavity 31 correspondingly, and the second magnetic core 4 will be located on the side of the cavity wall opposite to the opening 311, namely, the bottom side of the accommodating cavity 31. At this time, the second magnetic core 4 is set opposite to the portion of the windings 2 located outside the first magnetic core 1. Therefore, a weak magnetic flux circuit is provided outside the windings 2 for the external leakage magnetic flux of the windings 2, so that the leakage inductance of the magnetic assembly 200 is adjusted and maintained to be stable.

The second magnetic core 4 provides a weak magnetic flux circuit for the external leakage magnetic flux of the windings 2, thereby adjusting the leakage inductance of the magnetic assembly 200. In order to make the second magnetic core 4 have a better adjustment effect, in an embodiment, the second magnetic core 4 may be a plate-shaped piece, and one surface of the second magnetic core 4 is opposite to the windings 2, as shown in FIG. 4*a*.

In the embodiment, the second magnetic core 4 may be arranged to face the windings 2, thus the second magnetic core 4 has a larger coverage area in the direction facing the windings 2 while has a relatively smaller size in other directions (for example, the thickness direction of the second magnetic core 4). In this way, the volume and mass of the second magnetic core 4 can be small, and meanwhile a better leakage inductance adjustment effect can be achieved.

In this embodiment, in the case that the second magnetic core 4 is a plate-shaped piece, the thickness of the second magnetic core 4 may be 1 mm-10 mm.

Specifically, in the case that the second magnetic core 4 is a plate-shaped piece, it may have a variety of specific shapes.

In one embodiment, the second magnetic core 4 may be a flat plate-shaped piece. At this time, the plate surface direction of the second magnetic core 4 and the inner wall of the accommodating cavity 31 can be kept parallel to each other. Exemplarily, the accommodating cavity 31 may be a square cavity, and the plate surface direction of the second magnetic core 4 can be kept parallel with the bottom wall 312 of the accommodating cavity 31, and the second magnetic core 4 is placed between the windings 2 and the bottom wall 312 of the accommodating cavity 31.

In the embodiment, the second magnetic core 4 may have various plate surface shapes. For example, the plate surface shape of the second magnetic core 4 may match with the projection shape of the windings 2 on the second magnetic core 4, so as to achieve a better leakage inductance adjustment effect on the windings 2, and reduce the overall size of the second magnetic core 4 in its plate surface direction.

Exemplarily, the length of the second magnetic core 4 in the axial direction of the windings 2 may be equal to or similar to the dimension of the windings 2 in the axial direction, and the width of the second magnetic core 4 in the direction perpendicular to the axial direction of the windings 2 is also equal to or similar to the dimension of the windings 2 in this direction. In this way, the shape and the size of the second magnetic core 4 will match with the shape and the size of the windings 2, and thus the second magnetic core 4 has a smaller size under the premise of ensuring the leakage inductance regulation effect.

In another embodiment, the plate surface shape of the second magnetic core 4 and the shape of the accommodating cavity 31 may be matched with each other, and thus the second magnetic core 4 can form a larger coverage area for the windings 2, so that the magnetic assembly 200 has a better leakage adjustment effect.

In the above embodiments, the projection of the plate surface of the second magnetic core 4 in the direction perpendicular to the plate surface, may form a shape that is substantially similar to the windings 2 or the cavity of the accommodating cavity 31, and the second magnetic core 4 thus has a better covering capacity for the windings 2, thereby achieving a better leakage inductance adjustment and stabilization effect.

In some embodiments, the projection of the second magnetic core 4 on the windings 2 may cover at least part of the windings 2. In this way, the partial structure of the windings 2 on the side facing the second magnetic core 4, or all of the windings 2 can be covered by the second magnetic core 4, thereby achieving the leakage inductance adjustment and stabilization effect.

FIG. 7 is a schematic diagram of a projection range of a second magnetic core on windings of the magnetic assembly provided by an embodiment of the present disclosure. As shown in FIG. 7, in another embodiment, the projection of the second magnetic core 4 covers the projection of the windings 2, namely, the ratio of the respective projection area of the second magnetic core 4 and the windings 2 in the plane parallel to the bottom wall 312, may be greater than a preset value. Specifically, the ratio of the projection area of the second magnetic core 4 to the projection area of the entire windings 2 may be greater than 25% (for example, 25%-100%, etc.), so as to ensure the adjustment effect of the second magnetic core 4 on the leakage inductance. In FIG. 7, the projection of the second magnetic core 4 can completely cover the projection of entire windings 2.

In addition, in case that the second magnetic core 4 is a plate-shaped piece, besides the flat plate-shaped, the second magnetic core 4 may also be other different shapes and forms. In another structure of the second magnetic core 4, the shape of the second magnetic core 4 may match with the shape of the outer contour of the windings 2.

FIG. 8 is a schematic diagram of a third internal structure of the magnetic assembly shown in FIG. 3. FIG. 9 is a schematic cross-sectional view of the cross section A-A of the magnetic assembly shown in FIG. 8. As shown in FIG. 8 and FIG. 9, specifically, the windings 2 in the magnetic assembly 200 are wound on the first magnetic core 1, as a result the outer contour of the winding 2 will generally form a convex hull shape. Exemplarily, the windings 2 may be a rounded rectangular parallelepiped convex hull, or a cylindrical or elliptical cylindrical convex hull or the like. The outer contour of the windings 2 may be circular arc-shaped. Correspondingly, the shape of the second magnetic core 4 may also be circular arc-shaped, and the concave-convex direction of the second magnetic core 4 and that of the windings 2 remain the same.

Taking the structure in FIG. 8 and FIG. 9 as an example, the outer contour of the windings 2 facing the accommodating cavity 31 is generally in the shape of a circular arc protruding outward, correspondingly, the second magnetic core 4 will also be in the shape of a circular arc, and the extending direction of the second magnetic core 4 is approximately parallel to the axial direction of the windings 2.

Similar to the structure of the second magnetic core 4 mentioned above, when the second magnetic core 4 is circular arc-shaped, the shape of the plate surface of the second magnetic core 4 can match with the projection shape of the windings 2 on the second magnetic core 4, thereby forming a relatively complete coverage on the outside of the windings 2, so as to achieve a better leakage inductance adjustment and stabilization effect. Possible specific plate surface shape of the second magnetic core 4 is similar to the structure of the previous second magnetic core 4 and, thus, will not be repeated here.

In addition, it is easy to understand that, similar to the embodiment of the second magnetic core 4 being flat plate-shaped, when the shape of the second magnetic core 4 matches with the outer contour shape of the windings 2, the projection of the second magnetic core 4 on the windings 2 similarly occupies a preset ratio in the projection area of the entire windings 2. Specifically, the ratio of the projection of the second magnetic core 4 on the windings 2 to the projection area of the entire windings 2 is set to be greater than 25% (for example, 25%-100%), so as to ensure a better leakage inductance adjustment effect.

When the second magnetic core 4 matches with the outer contour shape of the windings 2, the second magnetic core 4 may cover the outside of the windings 2. Specifically, as shown in FIG. 8, both the outer contour of the windings 2 and the second magnetic core 4 may be circular arc-shaped, therefore, the second magnetic core 4 may surround and wrap the outside of the windings 2, in other words, the second magnetic core 4 is arranged outside the windings 2 in the circumferential direction of the windings 2.

In this embodiment, compared with the embodiment in which the second magnetic core 4 is a flat plate-shaped structure, the second magnetic core 4 not only is arranged on the side of the windings 2 facing the bottom wall 312 of the accommodating cavity 31, but also at least partially covers the arc side of the windings 2, i.e., the side of the windings 2 opposite to the part of the side cavity wall of the accommodating cavity 31. Correspondingly, most part of the windings 2 located in the accommodating cavity 31 will be wrapped and surrounded by the second magnetic core 4, and the second magnetic core 4 can form a larger covering area for the windings 2, thereby improving the adjustment effect of parameters, such as leakage inductance and the like.

When the second magnetic core 4 is arranged between the cavity wall of the accommodating cavity 31 and the windings 2, it is possible to have a certain relative position between the second magnetic core 4 and the windings 2, or between the second magnetic core 4 and the accommodating cavity 31 by means of a limiting structure or a stopper, thereby making the leakage inductance of the magnetic assembly more stable. The limiting structure or the stopper for limiting position may have various shapes and types. For example, a limiting structure may be provided on the second magnetic core 4 or the cavity wall of the accommodating cavity 31, so as to fix the position of the second magnetic core 4.

In an embodiment, since the windings 2 in the magnetic assembly 200 are arranged in a multi-slot manner, that is to say, there is an interval between adjacent windings 2 of the plurality of windings 2, the interval between different windings 2 can be used to locate the second magnetic core 4. FIG. 10 is a schematic diagram of a fourth internal structure of the magnetic assembly shown in FIG. 3. As shown in FIG. 10, specifically, a protrusion part 41 can be arranged on the second magnetic core 4, where the protrusion part 41 is arranged in one-to-one correspondence with an interval 2*a* between the adjacent windings 2, and the protrusion part 41 at least partially protrudes into the interval 2*a*.

In this embodiment, on the one hand, the protrusion part 41 can be located between the windings 2, so that the second magnetic core 4 has a certain position relative to the windings 2. On the other hand, the protrusion part 41 itself is placed on the second magnetic core 4, so the portion of the protrusion part 41 protruding into the interval 2*a* between the adjacent windings 2 can further exert a certain magnetic parameter adjustment effect, that is, the protrusion part 41 can achieve a leakage inductance adjustment effect similar to the main body of the second magnetic core 4 does. In this way, the protrusion part 41 on the second magnetic core 4 can further increase and stabilize the leakage inductance of the magnetic assembly 200, and reduce or even avoid the leakage inductance drop.

In another embodiment, the second magnetic core 4 may still have a plate-shaped structure, for example, a flat plate shape, or a shape matching with the outer contour of the windings 2. The protrusion part 41 may protrude from the plate surface of the second magnetic core 4, and partially or completely protrude into the interval 2*a* between adjacent windings 2. At this time, the side wall of the protrusion part 41 and the end surface of each winding 2 may abut against each other, so that the second magnetic core 4 can be fixed by using the windings 2. Exemplarily, in the structure of the magnetic assembly shown in FIG. 10, the second magnetic core 4 has a flat plate shape, and the protrusion part 41 is located on the side of the second magnetic core 4 facing the windings 2. When the second magnetic core 4 has a shape matching with the outer contour of the windings 2, for example, a circular arc shape, the protrusion part 41 may be located on the concave surface of the second magnetic core 4, as shown in FIG. 11 specifically.

The protrusion part 41 may have various structures and shapes. In some embodiments, the protrusion part 41 may be a flat plate-shaped protrusion, a columnar protrusion, a rib-shaped structure or the like. The shape and the size of the protrusion part 41 match with the width of the interval 2*a* between adjacent windings 2, so that the protrusion part 41 can protrude into the interval 2*a*, and thus the location of the winding 2 is fixed. In this embodiment, the protrusion part 41 is a rib-shaped protrusion, and the thickness of the protrusion part 41 match with that of the interval 2*a*, so that the protrusion part 41 can fit into the interval 2*a* between adjacent windings 2. The edge of the protrusion part 41 facing the windings 2 may have a circular arc-shaped contour matching with the shape of the interval 2*a* between the windings 2.

The length of the protrusion part 41 protruding into the interval 2*a* of adjacent windings 2 can be controlled within a certain range. In an embodiment, the length of the protrusion 41 protruding into the interval 2*a* may be 0.5 mm-10 mm. In this way, the windings 2 can provide a sufficiently reliable positioning function to the protrusion part 41, and increase and stabilize the leakage inductance of the magnetic assembly 200 within a certain range.

The number of protrusion parts 41 may be one or more. When there are multiple protrusion parts 41, the number of protrusion parts 41 may be the same as the number of intervals 2*a* between windings 2, and the protrusion parts 41 are arranged in one-to-one correspondence with the interval 2*a* between the adjacent windings 2, that is, different protrusion parts 41 respectively protrude into the corresponding intervals 2*a*, and thus the position of the windings 2 is fixed respectively. In this way, different parts of the second magnetic core 4 can be located respectively by means of a plurality of protrusion parts 41 located on different positions of the second magnetic core 4, and therefore it is advantageous to maintain the spatial posture of the second magnetic core 4 in the accommodating cavity 31.

When the protrusion part 41 is arranged on the second magnetic core 4, in another embodiment, the protrusion part 41 and the second magnetic core 4 may be integrally formed. In this way, it is convenient for the protrusion part 41 to achieve a leakage inductance adjustment function similar to the second magnetic core 4, and meanwhile the structure of the second magnetic core 4 is simpler, which is convenient for processing and manufacturing.

When the second magnetic core 4 needs to be located and fixed, the accommodating cavity 31 can also be used to locate the second magnetic core 4. Specifically, the second magnetic core 4 can be located by means of the shape of the cavity wall of the accommodating cavity 31.

In an embodiment, as shown in FIG. 4*a* and FIG. 4*b*, in this case, the corner part of the second magnetic core 4 has a locating notch 42; where the cavity wall of the accommodating cavity 31 has a locating protrusion 313 matching with the shape of the locating notch 42.

Specifically, taking the accommodating cavity 31 with a square cavity as an example, four corners of the second magnetic core 4 all have locating notches 42, and there are locating protrusions 313 in the cavity wall of the accommodating cavity 31 corresponding to the position of the locating notches 42, where the shape of the locating protrusion 313 and that of the locating notch 42 match with each other, so that the second magnetic core 4 can be located by the cavity wall of the accommodating cavity 31.

The locating protrusion 313 of the accommodating cavity 31 may extend along the depth direction of the accommodating cavity 31, thereby forming a convex column shape. In this way, the second magnetic core 4 can be smoothly placed into the accommodating cavity 31 without interfering with the locating protrusion 313.

As shown in FIG. 10 to FIG. 12, the magnetic assembly 200 may further include a bobbin 6, where the bobbin 6 is arranged on the first magnetic core 1, and the windings 2 is wound on the first magnetic core 1 by means of the bobbin 6.

Specifically, the bobbin 6 may include a plurality of partition parts 61 arranged separately along the circumferential direction of the windings 2, where the windings 2 are wound on the bobbin 6, and the interval between adjacent windings 2 is obtained by the partition part 61. In order to maintain the relative location between the second magnetic core 4 and the windings 2, the second magnetic core 4 and the bobbin 6 may be provided with a relatively fixed structure. FIG. 12 is a schematic diagram of a connection structure of the second magnetic core and a bobbin in the magnetic assembly provided by an embodiment of the present disclosure. As shown in FIG. 10 to FIG. 12, the side of the second magnetic core 4 facing the windings 2 is provided with a first locating part 43 that can abut against the bobbin 6. By abutting the first locating part 43 against the bobbin 6, the relative position and the relative distance between the second magnetic core 4 and the windings 2 can be controlled, and the locating and fixing of the second magnetic core 4 relative to the windings 2 can be achieved, thereby making the leakage inductance of the magnetic assembly 200 more stable. The first locating part 43 may have various forms and structures. In some embodiments, the first locating part 43 may have different shapes, such as a protrusion shape, a supporting post shape or other shapes, and abut against the bobbin 6 by using the top end of the protrusion or the support post. In addition, the first locating part 43 can further be used to maintain the relative position between the windings 2 and the second magnetic core 4. In an embodiment, the bobbin 6 is provided with a second locating part 62 matched and connected with the first locating part 43. Through the matching connection of the first locating part 43 and the second locating part 62, the second magnetic core 4 can be located on the bobbin 6.

The first locating part 43 may have a shape complementary to the second locating part 62, so as to achieve a matching connection therebetween. In this embodiment, the first locating part 43 is a protrusion, and the second locating part 62 is a clamping slot that the protrusion can protrude into. Thus, the first locating part 43 may insert or protrude into the second locating part 62, thereby achieving the connection between the first locating part 43 and the second locating part 62.

Alternatively, in another embodiment, the first locating part 43 may be a clamping slot, and the second locating part 62 may be a protrusion that can protrude into the clamping slot, thereby achieving the matching connection between the first locating part 43 and the second locating part 62. In this application, the specific shapes of the first locating part 43 and the second locating part 62 and the connection method therebetween are not limited herein.

In addition, in order to dissipate the heat of internal components of the magnetic assembly effectively, as another manner, the accommodating cavity 31 may be filled with a thermally conductive glue (not shown in figures), where the thermally conductive glue surrounds at least part of the structure of the first magnetic core 1, the second magnetic core 4 and the windings 2 respectively. When the magnetic assembly 200 is in operation, the heat generated by the windings 2, the first magnetic core 1 and the second magnetic core 4 can be transferred to the housing 3 through the heat conduction effect of the thermally conductive glue, thereby achieving heat dissipation.

The thermally conductive glue may completely fill the inner space of the accommodating cavity 31, or may merely fill a portion of the space of the accommodating cavity 31, and the thermally conductive glue only surrounds a part of the structures of the first magnetic core 1, the second magnetic core 4 and the windings 2.

After the thermally conductive glue is solidified, the thermally conductive glue itself will form a solid glue. Therefore, while conducting heat, the thermally conductive glue also has certain fixing and auxiliary locating effect on components, such as the second magnetic core 4, in the accommodating cavity 31.

In another embodiment, when the second magnetic core 4 is fixed by the thermally conductive glue, in order to ensure that the thermally conductive glue can fix the second magnetic core 4, the second magnetic core 4 will immerse in the thermally conductive glue. In this way, each part of the second magnetic core 4 is supported and fixed by the thermally conductive glue, so that the second magnetic core 4 remains fixed with respect to the windings 2, and at the same time, the thermally conductive glue can also have a better heat dissipation effect on the second magnetic core 4.

Because the second magnetic core 4 is located between the accommodating cavity 31 and the windings 2, when the surface of the second magnetic core 4 and that of the windings 2 are in close contact, the second magnetic core 4 may surround the larger area of the surface of the windings 2. In this case, the surrounded portion of the windings 2 achieves heat transfer with the thermally conductive glue by heat conduction through the second magnetic core 4. In an embodiment, the second magnetic core 4 is provided with at least one through-hole 44, and at least part of the first magnetic core 1 or the windings 2 is exposed inside the through-hole 44, where the thermally conductive glue may contact at least part of the windings 2 or at least part of the first magnetic core 1 via the through-hole 44, as shown in FIG. 4*b*. In this way, by arranging the through-hole 44 in the second magnetic core 4 to facilitate the injection of the thermally conductive glue, at least a part of the first magnetic core 1 or the windings 2 can be more exposed to the thermally conductive glue, thereby enhancing the heat dissipation between the windings 2 or the first magnetic core 1 and the thermally conductive glue.

The plurality of through-holes 44 may be arranged on the second magnetic core 4, and these through-holes 44 may be arranged on the second magnetic core 4 uniformly, so that different parts of the windings 2 or the first magnetic core 1 are in contact with the thermally conductive glue. The number and the size of the through-holes 44 can be set freely according to actual need.

In addition, in order to improve the overall heat dissipation capability of the magnetic assembly 200, besides providing with the thermally conductive glue in the accommodating cavity 31, a heat dissipation structure may also be provided on the housing 3 and other components. As shown in FIG. 5 and FIG. 9, a refrigerant passage 32 for refrigerant circulation can be provided inside the housing 3, where the refrigerant flows through the refrigerant passage 32, thereby using the refrigerant to improve the heat transfer capacity and heat dissipation efficiency of the housing 3. By means of the refrigerant, the heat of the housing 3 can be effectively conducted to the outside of the magnetic assembly 200, so as to dissipate heat for the magnetic assembly 200. In addition, it is also possible to replace the refrigerant with a medium having a higher thermal conductivity, thereby improving the heat dissipation effect for the housing 3 by the circulation of the medium.

Specifically, a refrigeration device (not shown in figures) may also be provided outside the magnetic assembly 200, so as to realize heat exchange and refrigerant circulation by using the refrigeration device. The refrigeration device may be integrated with the magnetic assembly 200, or may be separated from the magnetic assembly 200 and independently provided outside the magnetic assembly 200.

Specifically, in order to enable different parts of the housing 3 to achieve heat exchange with the refrigerant, there may be a plurality of refrigerant passages 32 inside the housing 3, where the plurality of refrigerant passages 32 are distributed in different parts of the housing. In this way, on the one hand, the heat conduction speed between the refrigerant and the housing 3 can be improved, and on the other hand, the heat dissipation in each part of the housing 3 is more uniform, thereby avoiding the local overheating of the magnetic assembly 200.

In this embodiment, the magnetic assembly may specifically include: a first magnetic core, a plurality of windings, a housing and a second magnetic core, where the first magnetic core has a winding area; the plurality of windings are wound with an interval on the winding area of the first magnetic core; the housing has an accommodating cavity, in which at least part of the plurality of windings is accommodated; and the second magnetic core is arranged between a cavity wall of the accommodating cavity and the plurality of windings. In this way, by means of adjustment of the second magnetic core (weak magnetic regulation branch), the leakage inductance of the magnetic assembly can be flexibly adjusted and maintained to be stable, so as to ensure the reliable operation of the magnetic assembly and the entire power supply apparatus. At the same time, because the second magnetic core can guide the external leakage magnetic flux of the windings, the loss caused by the accommodating cavity is reduced, thereby improving the efficiency of power supply apparatus.

The present disclosure also provides a power supply apparatus, including the magnetic assembly in embodiments described above, where the magnetic assembly can realize voltage conversion including voltage step-up or step-down for the power supply apparatus, and safety isolation and other functions. The specific structure, function, and working principle of the magnetic assembly have been described in detail in the foregoing embodiments, and will not be repeated here.

Specifically, the power supply apparatus can be applied to an on-board charger module(OBCM). In this way, the power supply apparatus can provide power to an on-board high-voltage battery of the electric vehicle or on-board equipment, so as to ensure the normal operation of the vehicle and the on-board equipment.

In this embodiment, the power supply apparatus includes a magnetic assembly, where the magnetic assembly may include: a first magnetic core, a plurality of windings, a housing, a second magnetic core; where the first magnetic core has a winding area; the plurality of windings are wound with an interval on the winding area of the first magnetic core; the housing has an accommodating cavity, in which at least part of the plurality of windings is accommodated; the second magnetic core is arranged between a cavity wall of the accommodating cavity and the plurality of windings. In this way, by means of adjustment of the second magnetic core (weak magnetic regulation branch), the leakage inductance of the magnetic assembly can be maintained to be stable, so as to ensure the reliable operation of the magnetic assembly and the whole power supply apparatus; at the same time, because the second magnetic core can guide the external leakage magnetic flux of the windings, the loss caused by the accommodating cavity is reduced, thereby improving the efficiency of the power supply apparatus.

Finally, it should be noted that the above respective embodiments are used to only explain the technical solution of the present disclosure, instead of constituting a limitation thereto. Although the present disclosure has been described in detail with reference to the aforementioned embodiments, it should be understood by those skilled in the art that they can still be modify the technical solutions recited in the aforementioned embodiments, or replace some or all of the technical features equally, and these modifications or replacements do not separate the essence of the corresponding technical solutions from the scope of technical solutions of the present disclosure.

What is claimed is:

1. A magnetic assembly, comprising:

a first magnetic core and a plurality of windings, wherein the first magnetic core has a winding area, and the plurality of windings are wound with an interval on the winding area of the first magnetic core;

a housing, wherein the housing has an accommodating cavity, and at least part of the plurality of windings is accommodated in the accommodating cavity, and a second magnetic core, wherein the second magnetic core is arranged between a cavity wall of the accommodating cavity and the plurality of windings;

wherein the accommodating cavity has an opening and the second magnetic core is located on a side of the cavity wall opposite to the opening; and wherein the second magnetic core is used to adjust and stabilize leakage inductance of the magnetic assembly.

2. The magnetic assembly according to claim 1, wherein the first magnetic core is accommodated in the accommodating cavity through the opening of the accommodating cavity.

3. The magnetic assembly according to claim 2, wherein the first magnetic core has a non-winding area, which is located on a side opposite to the winding area.

4. The magnetic assembly according to claim 1, wherein the plurality of windings comprises at least one primary winding and at least one secondary winding, and the second magnetic core is used to adjust and stabilize leakage inductance between the primary winding and the secondary winding of the magnetic assembly.

5. The magnetic assembly according to claim 4, wherein a range of leakage inductance adjusted by the second magnetic core is 0%-30%.

6. The magnetic assembly according to claim 1, wherein the second magnetic core is a plate-shaped piece, and the plate surface of the second magnetic core is opposite to the plurality of windings.

7. The magnetic assembly according to claim 6, wherein the second magnetic core is a flat plate-shaped piece or matches with outer contour shape of the plurality of windings; and/or a projection of the second magnetic core on the plurality of windings covers at least part of the windings.

8. The magnetic assembly according to claim 7, wherein the second magnetic core matches with the outer contour shape of the plurality of windings, and the second magnetic core surrounds outside of the plurality of windings; and/or the projection of the second magnetic core on the plurality of windings covers more than 25% area of the windings.

9. The magnetic assembly according to claim 1, wherein the thickness of the second magnetic core is 1 mm-10 mm; and/or a distance between the second magnetic core and the plurality of windings is 0mm-20 mm.

10. The magnetic assembly according to claim 6, wherein the second magnetic core is provided with a protrusion part, wherein the protrusion part is arranged in one-to-one correspondence with the interval between adjacent windings, and the protrusion part at least partially protrudes into the interval.

11. The magnetic assembly according to claim 10, wherein the length of the protrusion part protruding into the interval is 0.5 mm-10 mm; and/or the protrusion part and the second magnetic core are integrally formed.

12. The magnetic assembly according to claim 6, further comprising:

a bobbin, wherein the bobbin is arranged on the first magnetic core, and the plurality of windings are wound on the first magnetic core through the bobbin;

a side of the second magnetic core facing the plurality of windings is provided with a first locating part that can abut against the bobbin.

13. The magnetic assembly according to claim 12, wherein the bobbin is provided with a second locating part matching and connecting with the first locating part; and wherein the first locating part is a protrusion, and the second locating part is a clamping slot that the protrusion can protrude into; or the first locating part is a clamping slot, and the second locating part is a protrusion that can protrude into the clamping slot.

14. The magnetic assembly according to claim 6, wherein a corner part of the second magnetic core has a locating notch; and the cavity wall of the accommodating cavity has a locating protrusion matching with the shape of the locating notch.

15. The magnetic assembly according to claim 1, wherein a material of the second magnetic core is ferrite, magnetic powder core material, or amorphous magnetic conductive material; and/or a material of the housing is aluminum, aluminum alloy or copper.

16. The magnetic assembly according to claim 1, wherein the accommodating cavity is filled with thermally conductive glue, wherein the thermally conductive glue respectively surrounds the first magnetic core, the second magnetic core and at least part of the plurality of windings.

17. The magnetic assembly according to claim 1, wherein the second magnetic core is provided with at least one through-hole, wherein the winding area is exposed inside the through-hole, and the thermally conductive glue is in contact with at least part of the windings or the first magnetic core through the through-hole.

18. The magnetic assembly according to claim 1, wherein a passage for refrigerant circulation is provided inside of the housing.

19. A power supply apparatus comprising a magnetic assembly, wherein the magnetic assembly comprises:

a first magnetic core and a plurality of windings, wherein the first magnetic core has a winding area, and the plurality of windings are wound with an interval on the winding area of the first magnetic core;

a housing, wherein the housing has an accommodating cavity, and at least part of the plurality of windings is accommodated in the accommodating cavity, and a second magnetic core, wherein the second magnetic core is arranged between a cavity wall of the accommodating cavity and the plurality of windings;

wherein the accommodating cavity has an opening and the second magnetic core is located on a side of the cavity wall opposite to the opening; and wherein the second magnetic core is used to adjust and stabilize leakage inductance of the magnetic assembly.

20. The power supply apparatus according to claim 19, wherein, the power supply apparatus is used for an on-board charger (OBC).

* * * * *